(12) United States Patent
Yoshioka et al.

(10) Patent No.: US 12,407,489 B2
(45) Date of Patent: Sep. 2, 2025

(54) SIGNAL GENERATION DEVICE AND SIGNAL GENERATION METHOD

(71) Applicant: ANRITSU CORPORATION, Atsugi (JP)

(72) Inventors: Hironori Yoshioka, Atsugi (JP); Tatsuya Iwai, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 300 days.

(21) Appl. No.: 18/333,858

(22) Filed: Jun. 13, 2023

(65) Prior Publication Data

US 2024/0039688 A1 Feb. 1, 2024

(30) Foreign Application Priority Data

Aug. 1, 2022 (JP) .................................. 2022-122608

(51) Int. Cl.
*H04L 7/00* (2006.01)
*H04B 1/04* (2006.01)
(Continued)

(52) U.S. Cl.
CPC ............... *H04L 7/005* (2013.01); *H04B 1/04* (2013.01); *H04L 7/02* (2013.01); *H04L 1/0033* (2013.01);
(Continued)

(58) Field of Classification Search
CPC ......... H04L 7/0016; H04L 7/005; H04L 7/00; H04L 7/02; H04L 49/00; H04L 49/90; H04L 7/0091; H04L 25/026; H04L 25/028; H04L 25/03343; H04L 25/04; H04L 25/40; H04L 47/431; H04L 47/622; H04L 1/0033; H04L 1/0041; H04L 1/009; H04L 13/00;
(Continued)

(56) References Cited

U.S. PATENT DOCUMENTS 10,623,174 B1 *   4/2020   Remla .................. H04L 7/0029
2010/0239252 A1 * 9/2010   Davis .................. H04Q 11/0067
                                                                398/58

(Continued)

FOREIGN PATENT DOCUMENTS

JP    6082419 B2    1/2017
JP    6346212 B2    6/2018

*Primary Examiner* — Warner Wong
(74) *Attorney, Agent, or Firm* — Greer Burns & Crain Ltd.

(57) ABSTRACT

A signal generation device includes m transceivers, a usage amount determination unit that executes a usage amount determination process that determines the usage amount of the FIFO of each transceiver, and a phase adjustment unit that adjusts the phase of the read clock signal for the FIFO. The signal generation device performs the second usage amount determination process on the condition that the count that the usage amount of the FIFO of each transceiver is determined to be less than the usage amount threshold by the first usage amount determination process consecutively reaches the first determination count, and terminates the adjustment of the phase of the read clock signal on the condition that the count that the usage amount of the FIFO of each transceiver is determined by the second usage amount determination process to be greater than the usage amount threshold consecutively reaches the second determination count.

7 Claims, 8 Drawing Sheets

(51) Int. Cl.
*H04L 7/02* (2006.01)
*H04L 1/00* (2006.01)
*H04L 13/00* (2006.01)
*H04L 25/02* (2006.01)
*H04L 49/90* (2022.01)

(52) U.S. Cl.
CPC ............ *H04L 13/00* (2013.01); *H04L 25/026* (2013.01); *H04L 49/90* (2013.01)

(58) Field of Classification Search
CPC ............ H04L 2027/0018; H04L 17/02; H04L 47/50; H04L 2012/5681; H04L 27/0002; H04L 27/12; H04L 27/20; H04L 27/2026; H04L 27/36; H04L 15/04; H04B 1/00; H04B 1/02; H04B 1/04; H04B 1/1858; H04B 1/38; H04B 3/02; H04B 10/40; H04B 10/50
See application file for complete search history.

(56) References Cited

U.S. PATENT DOCUMENTS

| | | | |
|---|---|---|---|
| 2010/0322354 A1* | 12/2010 | Tanimoto | H04B 1/74 375/295 |
| 2015/0071642 A1* | 3/2015 | Tanaka | H04B 10/548 398/115 |
| 2022/0303025 A1* | 9/2022 | Cheng | H04B 17/11 |
| 2023/0160955 A1* | 5/2023 | Chou | G01R 31/3183 324/762.01 |
| 2023/0188236 A1* | 6/2023 | Hayama | H04B 1/02 370/535 |
| 2025/0106074 A1* | 3/2025 | Yoshioka | H04B 1/40 |

* cited by examiner

| Consecutive Determination Count | Maximum Phase Difference ± | |
|---|---|---|
| | [ps] | [UI] |
| 10 | 6.8 | 0.22 |
| 100 | 6.2 | 0.20 |
| 1000 | 5.0 | 0.16 |
| 5000 | 4.2 | 0.13 |
| 8000 | 2.4 | 0.08 |
| 10000 | 1.3 | 0.04 |
| 65535 | 0.6 | 0.02 |

FIG.4

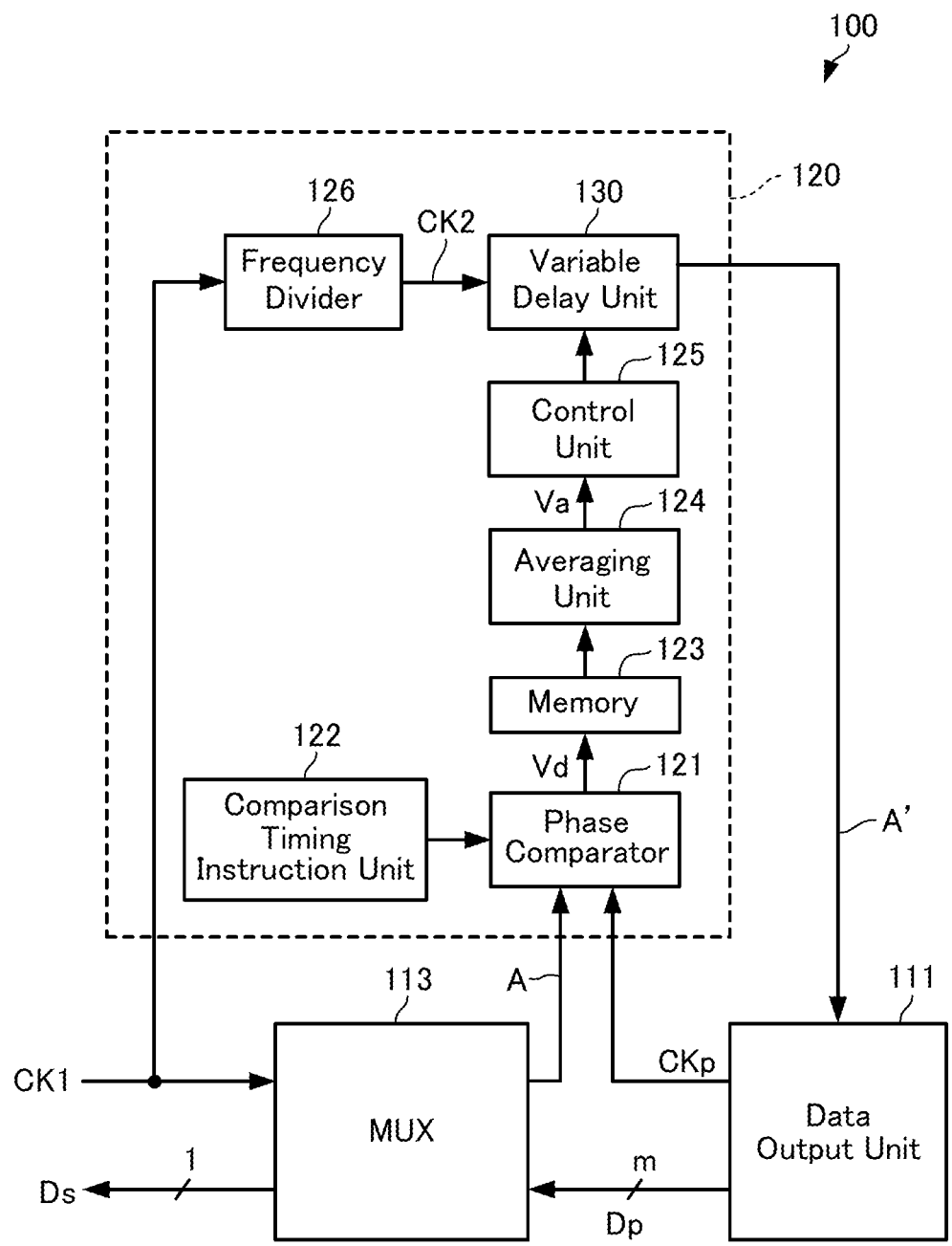
FIG.8  < Prior Airt >

SIGNAL GENERATION DEVICE AND SIGNAL GENERATION METHOD

FIELD OF THE INVENTION

The present invention relates to a signal generation device and a signal generation method, and more particularly to a signal generation device and a signal generation method for converting and outputting parallel data into high-speed serial data.

PRIOR ART

The speed of Ethernet has increased significantly in recent years, and the standardization of 800 GbE (Gigabit Ethernet) and 1.6 TbE (Terabit Ethernet) is in sight. Along with the development of these high-speed Ethernets, it is desired to deal with the measurement environment such as bit error rate (BER) measurement for evaluating the quality of communication equipment. Such a measurement environment should, of course, be able to handle high-speed signals, but should also be able to flexibly cope with changes associated with changes in the policy of standards, changes in development targets, and the like. In order to achieve this, for example, a signal generation device that generates test signals can be configured using an FPGA (Field Programmable Gate Array), and a signal generation device capable of outputting 128 G Symbol/s (1024 Gbps) signals using an FPGA is desired.

However, it is usually not possible to output a signal of that speed with one transceiver channel of an FPGA. Therefore, it is necessary to secure a target signal output rate by serializing parallel outputs from a plurality of transceivers using a multiplexer (MUX) or a DAC (Digital Analog Converter) (see, for example, Patent Document 1). At this time, the output data from all transceiver channels must be inputted to the MUX with the phases aligned (see, for example, Patent Document 2). Specifically, it is desired that the maximum phase difference between all channels is 0.1 UI (Unit Interval) or less. For example, when the output per channel of the transceiver is 32 Gbps, it is desired that the time is about 3.1 ps or less.

In order to adjust the inter-channel phase, there is a method of individually controlling the phase of the external clock inputted to each channel. However, if, for example, the maximum speed of one channel of the transceiver is 32 Gbps, 32 channels of output are required to achieve signal output of 1024 Gbps. Since clock inputs are required for each of these outputs, the IO resources of the transceiver may be insufficient. In addition, since these input/output channels basically need to be in the vicinity of each other, wiring may not be possible physically even for an FPGA having a total of 64 or more channels.

FIG. 8 is a block diagram showing the configuration of a conventional data signal generation device disclosed in Patent Document 1, which converts parallel data into high-speed serial data using MUX and outputs the data. The data signal generation device 100 is provided with a synchronization device 120 for making the output timing of the parallel data input from the data output unit 111 to the MUX 113 correctly synchronized with the serial conversion operation of the MUX 113.

The synchronization device 120 includes a frequency divider 126 that divides the frequency of the reference clock signal CK1 and outputs a dividing clock signal CK2, a phase comparator 121 that compares the phase of a signal A, which determines the timing of the serial conversion operation of the MUX 113, with the data synchronization clock signal CKp from data output unit 111, a comparison timing instruction unit 122 that instructs the comparison timing of the phase comparator 121 randomly in time, a memory 123 that sequentially stores the voltage Vd of the detection signal detected by the phase comparator 121, an averaging unit 124 for obtaining the voltage Vd of the detection signal a predetermined count of times based on the instruction of the comparison timing instruction unit 122 and calculating the average voltage Va of the detection signal, a control unit 125 that generates control signals according to the average voltage Va, and a variable delay unit 130 that delays the reference clock signal CK1 or the dividing clock signal CK2 according to the control signal.

This means that the technique disclosed in Patent Document 1 measures the phase difference between the signal A that determines the timing of the serial conversion operation of the MUX 113 and the data synchronization clock signal CKp from the data output unit 111, adjusts the output timing of parallel data from the data output unit 111. Furthermore, in order to reduce the maximum phase difference between channels, the parallel data outputted from the data output unit 111 is preferably inputted to the MUX 113 after being phase-adjusted by the automatic phase adjustment method disclosed in Patent Document 2.

CITATION LIST

Patent Literature

[Patent Document 1] Patent No. 6082419
[Patent Document 2] Patent No. 6346212

SUMMARY OF THE INVENTION

Technical Problem

However, the technology disclosed in Patent Document 2 has a problem that, depending on the magnitude of the maximum phase difference between the channels of the data output unit 111, the phases of the serial data constituting the parallel data outputted from the data output unit 111 are adjusted at positions that are more than one clock off from each other. In this case, unintended data is generated when parallel data is multiplexed using the MUX 113. For example, if this unintended data is used as a test signal for BER measurement, the test signal itself has an error, making correct BER measurement impossible.

The present invention has been made to solve such conventional problems. An object of the present invention is to provide a signal generation device and a signal generation method capable of reducing the absolute value of the phase difference between serial data outputted from a plurality of transceivers respectively to 0.1 UI or less.

Means to Solve the Problem

In order to solve the above-mentioned problems, a signal generation device according to the present invention comprises: a parallel data output unit that outputs m×N-bit width parallel data; a transceiver unit that converts the m×N-bit width parallel data outputted from the parallel data output unit into m-bit width parallel data and outputs the data; and a phase synchronization control unit that controls the phase of the m-bit width parallel data outputted from the transceiver unit, wherein the transceiver unit has m transceivers that convert N-bit width parallel data out of the m×N-bit width parallel data into 1-bit width serial data, each of the transceivers has: a FIFO (First-In First-Out) that stores the N-bit width parallel data and reads out the N-bit width parallel data according to a read clock signal; a PISO (Parallel-In Serial-Out) that converts the N-bit width parallel data read from the FIFO into the 1-bit width serial data; a usage amount determination unit that executes usage amount determination process for determining whether the usage amount of the FIFO is equal to or greater than the usage amount threshold; and a phase adjustment unit that performs a first phase adjustment process for decreasing the phase of the read clock signal by a predetermined amount and a second phase adjustment process for increasing the phase of the read clock signal by a predetermined amount, the phase synchronization control unit performs: the phase synchronization control unit has the usage amount determination unit perform a first usage amount determination process as the usage amount determination process, on the condition that the output of the serial data from each of the transceivers has started; the phase synchronization control unit has the phase adjustment unit perform the first phase adjustment process, on the condition that the usage amount of the FIFO of each transceiver is determined to be greater than the usage amount threshold by the first usage amount determination process; the phase synchronization control unit has the usage amount determination unit perform a second usage amount determination process as the usage amount determination process, on the condition that the count that the usage amount of the FIFO of each transceiver is consecutively determined by the first usage amount determination process to be less than the usage amount threshold reaches a first determination count; the phase synchronization control unit has the phase adjustment unit perform the second phase adjustment process, on the condition that the usage amount of the FIFO of each of the transceivers is determined to be less than the usage amount threshold by the second usage amount determination process; and the phase synchronization control unit has the phase adjustment unit complete the adjustment of the phase of the read clock signal, on the condition that the count that the usage amount of the FIFO of each of the transceivers is consecutively determined by the second usage amount determination process to be greater than the usage amount threshold reaches a second determination count.

By this configuration, the signal generation device according to the present invention perform the second usage amount determination process, on the condition that the count that the usage amount of the FIFO of each transceiver is consecutively determined by the first usage amount determination process to be less than the usage amount threshold reaches the first determination count. Further, in the signal generation device according to the present invention finish the adjustment of the phase of the read clock signal, on the condition that the count of times the usage amount of the FIFO of each transceiver is consecutively determined to be equal to or greater than the usage amount threshold by the second usage amount determination process reaches the second determination count. By this configuration, the signal generation device according to the present invention can reduce the absolute value of the phase difference between the serial data outputted from the plurality of transceivers to 0.1 UI or less.

Further, in the signal generation device according to the present invention, the parallel data output unit, the transceiver unit, and the phase synchronization control unit are configured on an FPGA (Field Programmable Gate Array).

By this configuration, the signal generation device according to the present invention can easily change the bit width of the parallel data outputted from the parallel data output unit and the number of transceiver channels, thus flexibly responding to any future changes or expansions in standards.

Further, the signal generation device according to the present invention may further comprise: a determination count setting unit that sets the first and second determination counts to the phase synchronization control unit is further provided, the determination count setting unit includes: a determination count provisional setting unit that provisionally sets arbitrary values to the phase synchronization control unit as the first and second determination counts; a maximum phase difference acquisition unit that acquires a maximum phase difference among the phase differences between the serial data outputted from each of the m transceivers when the phase adjustment of the read clock signal by the phase adjustment unit based on the first and second determination counts provisionally set by the determination count provisional setting unit is completed; a storage unit that stores data indicating a relationship between the first and second determination counts provisionally set by the determination count provisional setting unit and the maximum phase difference acquired by the maximum phase difference acquisition unit: an approximate curve calculation unit that calculates an approximate curve of the data stored in the storage unit; a determination count estimation unit that estimates the first and second determination counts for realizing the maximum phase difference to be targeted based on the approximate curve; and a determination count main setting unit that performs a main setting of the first and second determination counts estimated by the determination count estimation unit to the phase synchronization control unit.

By this configuration, the signal generation device according to the present invention can estimate the optimum count of determinations by approximating the measurement results of the first and second determination counts and the maximum phase difference. Thus, the signal generation device according to the present invention can eliminate the need to increase the count of determinations unnecessarily by obtaining the optimum count of determinations, and can shorten the completion time of phase synchronization processing between transceiver channels.

Further, the signal generation device according to the present invention may be further provided with: a multiplexer that receives the m-bit width parallel data outputted from the transceiver unit based on a dividing clock signal by which a reference clock signal is divided by m and outputs n-bit width data in accordance with the rate of the reference clock signal; a synchronization device that synchronizes the m-bit width parallel data outputted from the transceiver unit with the dividing clock signal based on the phase difference between the phase of a data synchronization clock signal synchronized with the m-bit width parallel data outputted from the transceiver unit and the phase of the dividing clock signal; and a DAC that outputs an analog signal in accordance with the n-bit width data outputted from the multiplexer.

By this configuration, the signal generation device according to the present invention can reduce the absolute value of the maximum phase difference between serial data outputted from a plurality of transceivers to 0.1 UI or less, so that the serial data can be generated as intended when multiplexing the parallel data outputted from the transceiver unit using MUX.

Further, a signal generation method according to the present invention is a signal device generation, using a signal generation device, wherein the signal generation device has: a parallel data output unit that outputs m×N-bit width parallel data; and a transceiver unit that converts the m×N-bit width parallel data outputted from the parallel data output unit into m-bit width parallel data and outputs the data, the signal generation device has a phase synchronization control unit that controls the phase of the m-bit width parallel data outputted from the transceiver unit, the transceiver unit has m transceivers that convert N-bit width parallel data out of the m×N-bit width parallel data into 1-bit width serial data, each of the transceivers has: a FIFO (First-In First-Out) that stores the N-bit width parallel data and reads out the N-bit width parallel data according to a read clock signal; a PISO (Parallel-In Serial-Out) that converts the N-bit width parallel data read from the FIFO into the 1-bit width serial data; a usage amount determination unit that executes usage amount determination process for determining whether the usage amount of the FIFO is equal to or greater than the usage amount threshold; and a phase adjustment unit that performs a first phase adjustment process for decreasing the phase of the read clock signal by a predetermined amount and a second phase adjustment process for increasing the phase of the read clock signal by a predetermined amount, the phase synchronization control unit performs: a step to have the usage amount determination unit perform a first usage amount determination process as the usage amount determination process, on the condition that the output of the serial data from each of the transceivers has started; a step to have the phase adjustment unit perform the first phase adjustment process, on the condition that the usage amount of the FIFO of each transceiver is determined to be greater than the usage amount threshold by the first usage amount determination process; a step to have the usage amount determination unit perform a second usage amount determination process as the usage amount determination process, on the condition that the count that the usage amount of the FIFO of each transceiver is consecutively determined by the first usage amount determination process to be less than the usage amount threshold reaches a first determination count; a step to have the phase adjustment unit perform the second phase adjustment process, on the condition that the usage amount of the FIFO of each of the transceivers is determined to be less than the usage amount threshold by the second usage amount determination process; and a step to have the phase adjustment unit complete the adjustment of the phase of the read clock signal, on the condition that the count that the usage amount of the FIFO of each of the transceivers is consecutively determined by the second usage amount determination process to be greater than the usage amount threshold reaches a second determination count.

Effect of the Invention

The present invention provides a signal generation device and a signal generation method that can reduce the absolute value of the phase difference between serial data outputted from a plurality of transceivers to 0.1 UI or less.

BRIEF DESCRIPTION OF DRAWINGS

FIG. 4 is a table showing the relationship between the consecutive determination count in phase synchronization processing and the maximum phase difference between m transceivers.

FIG. 8 is a block diagram showing the configuration of a conventional data signal generation device.

DETAILED DESCRIPTION OF EMBODIMENTS

Embodiments of a signal generation device and a signal generation method according to the present invention will be described below with reference to the drawings.

Figure 1:
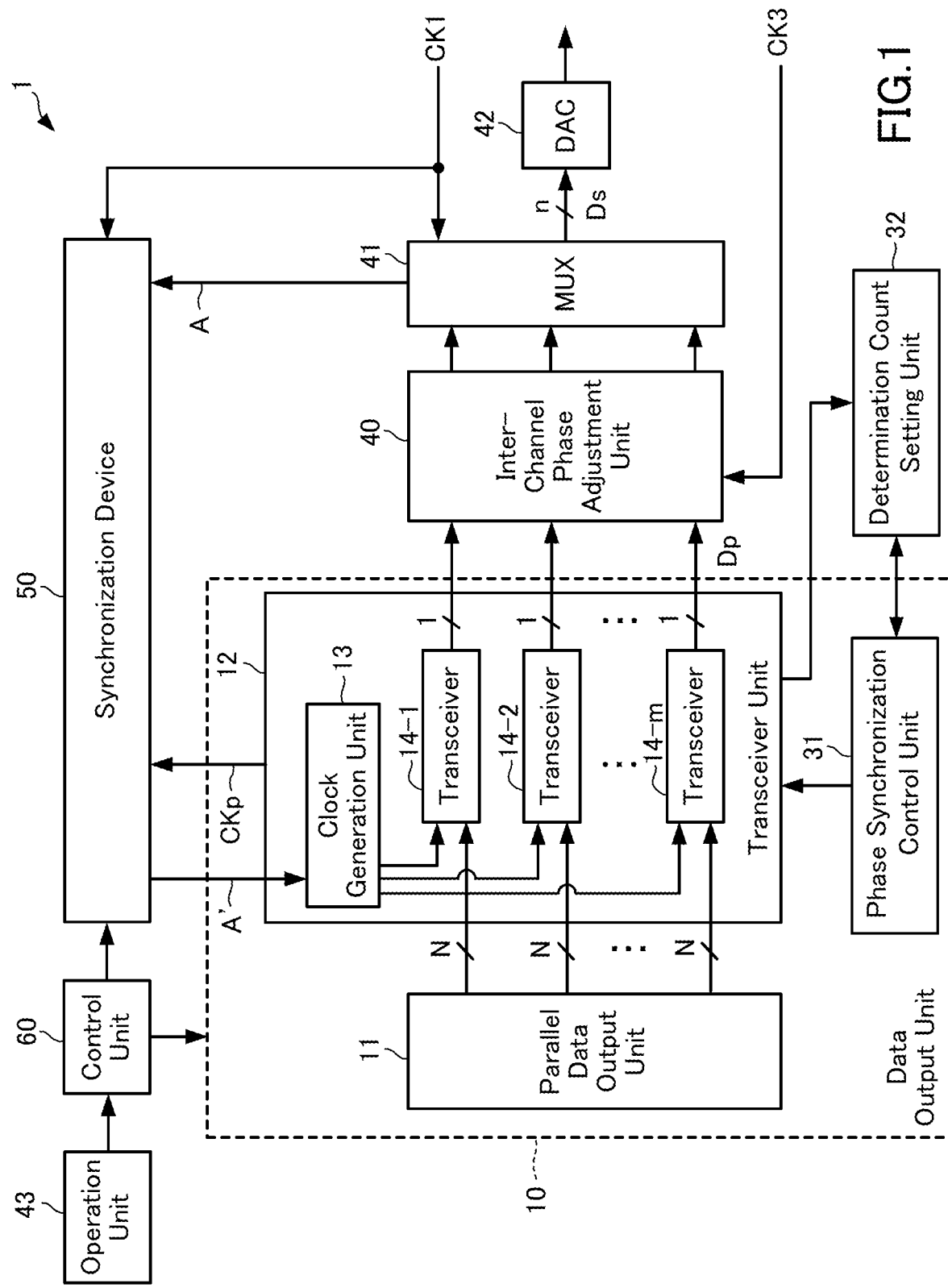
FIG. 1 is a block diagram showing the configuration of a signal generation device according to an embodiment of the present invention.

The signal generation device 1 according to the present embodiment shown in FIG. 1 comprises: a data output unit 10; a determination count setting unit 32; an inter-channel phase adjustment unit 40; a MUX 41; a DAC 42; an operation unit 43; a synchronization device 50; and a control unit 60. Although the data output unit 10 is configured on, for example, an FPGA or an ASIC, the following description assumes that these are configured on an FPGA.

The data output unit 10 includes a parallel data output unit 11, a transceiver unit 12, and a phase synchronization control unit 31.

The parallel data output unit 11 has an internal memory (not shown) that stores a series of data strings of a predetermined pattern in advance, or an arithmetic circuit (not shown) that generates this data string, and it designed to output m×N-bit width parallel data. Here, m and N are each an integer of 2 or more.

The parallel data output unit 11 outputs a pattern of a PAM signal consisting of, for example, a multi-value K (K is an integer of 2 or more), as an m×N-bit width parallel data, based on the pattern information inputted from the operation unit 43. The parallel data output unit 11 generates, for example, an NRZ signal (K=2), a PAM3 signal (K=3), a PAM4 signal (K=4), a PAM5 signal (K=5), a PAM6 signal (K=6), a PAM7 A PAM signal pattern consisting of arbitrary multilevel K such as a signal (K=7), a PAM8 signal (K=8). Here, the pattern information is PAM signal pattern information such as the value of K and the type of pattern (for example, PRBS (Pseudo Random Binary Sequence) pattern, SSPRQ (Short Stress Pattern Random Quaternary) pattern, arbitrary pattern).

The transceiver unit 12 has a clock generation unit 13 that generates a clock signal based on the data request signal A' from the synchronization device 50, and m transceivers 14-1 to 14-m.

Each of the transceivers 14-1 to **14-*m* is an output section of the FPGA and outputs a digital signal of 0 or 1. Each of the transceivers 14-1 to 14-*m* is adapted to convert N-bit width parallel data out of the m×N-bit width parallel data outputted from the parallel data output unit 11 into 1-bit width serial data at the timing of the clock signal generated by the clock generation unit 13. This means that the transceiver unit 12 converts the m×N-bit width parallel data outputted from the parallel data output unit 11** into m-bit width parallel data Dp and outputs the m-bit width parallel data Dp.

Further, the transceiver unit 12 outputs a data synchronization clock signal CKp synchronized with the output timing of the m-bit width parallel data Dp. As a configuration for outputting the data synchronization clock signal CKp, for example, the data output unit 10 may be provided with a clock recovery circuit (not shown) that generates a recovery clock signal from the parallel data Dp. Alternatively, in addition to the m transceivers 14-1 to **14-*m*, the transceiver unit 12** may be provided with a clock output transceiver (not shown) that outputs a data synchronization clock signal CKp which is synchronized with the output timing of the parallel data Dp.

Figure 2:
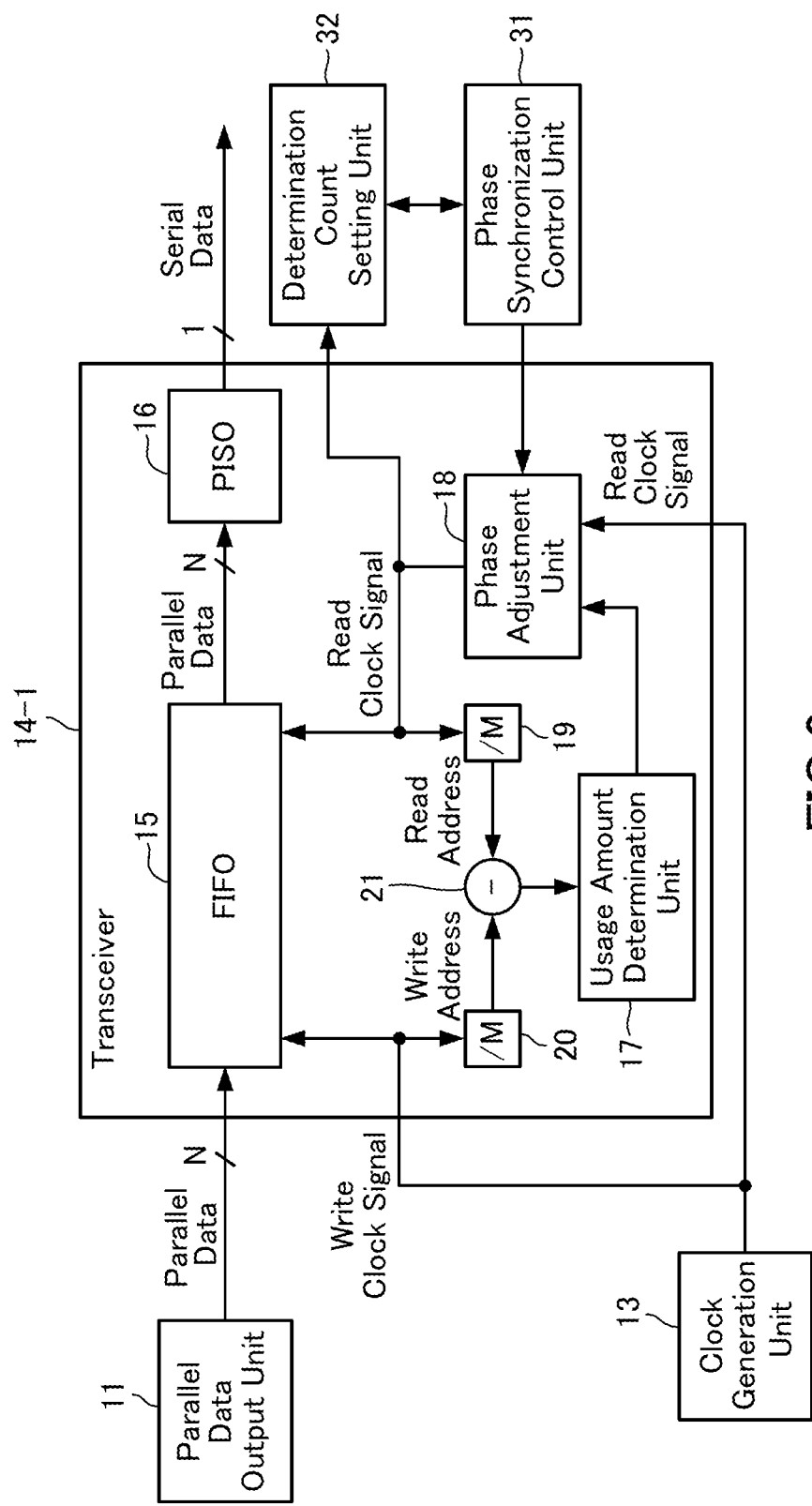
FIG. 2 is a block diagram showing the configuration of one channel of a transceiver unit provided in the signal generation device according to the embodiment of the present invention.

FIG. 2 is a figure showing the configuration of one channel of the transceiver unit 12. Although the configuration of the transceiver 14-1 is shown here as an example, other transceivers 14-2 to **14-*m*** have similar configurations.

As shown in FIG. 2, each transceiver 14-1 to **14-*m* has a FIFO (First-In First-Out) 15 that stores N-bit width parallel data out of the m×N-bit width parallel data outputted from the parallel data output unit 11, a PISO (Parallel-In Serial-Out) 16, which converts N-bit width parallel data read from FIFO 15 to 1-bit width serial data in response to a read clock signal, a usage amount determination unit 17 that performs first and second usage amount determination processes to determine whether the usage amount of the FIFO 15 is greater than or equal to a usage amount threshold, a phase adjustment unit 18 for adjusting the phase of the read clock signal of the FIFO 15 so as to decrease or increase, frequency dividers 19, 20, and a subtractor 21**.

This means that each of the transceivers 14-1 to **14-*m* reads the stored N-bit width parallel data from the FIFO 15, performs parallel/serial conversion on the read parallel data in the PISO 16**, and outputs the serial data.

In the signal generation device 1 according to the present embodiment, the transceiver unit 12 can be configured by a transceiver equipped with a function of adjusting the phase of the read clock signal, for example, like the TX Phase Interpolator PPM Controller (hereinafter referred to as "TXPI") provided by Xilinx. For example, an UltraScale+ with a GTY transceiver from Xilinx can be suitably used as the FPGA of which the data output unit 10 is composed.

In general, multiple transceivers configured on an FPGA do not necessarily match each other in timing until data is actually output after they are activated or reset. Therefore, at the timing when data output starts, the amount of usage amount of the FIFO 15 of each of the transceivers 14-1 to **14-*m*** is usually different. Also, when focusing on one transceiver, the amount of usage when data output is started may be different for each activation or reset.

The basic operation of TXPI will be described below hereinafter with reference to FIG. 2.

The FIFO 15 functions as a buffer for the parallel data outputted from the parallel data output unit 11, and can store up to M words of N-bit width parallel data. The FIFO 15 is adapted to write or read N-bit width parallel data at the rising edge of the input write clock signal or read clock signal. The write clock signal and the read clock signal are signals based on the clock signal generated by the clock generation unit 13, for example. The clock signal generated by the clock generation unit 13 is distributed to each of the transceivers 14-1 to **14-*m*. As a result of this, the number of clock inputs to the transceiver unit 12 can be made smaller than the number m of the transceivers 14-1 to 14-*m*, so that the consumption of IO resources of the transceiver unit 12** can be reduced.

The frequency divider 19 is adapted to divide the read clock signal by the maximum number of words M of the FIFO 15 so as to obtain the read address of the FIFO 15. On the other hand, the frequency divider 20 is adapted to divide the frequency of the write clock signal by the maximum number of words M of the FIFO 15 so as to obtain the write address of the FIFO 15.

The subtractor 21 is adapted to output the difference between the read address and write address outputted from the frequency dividers 19 and 20, respectively. The difference outputted from subtractor 21 reflects the usage amount of FIFO 15.

The usage amount determination unit 17 is adapted to perform the first and second usage amount determination processes for determining whether or not the difference outputted from the subtractor 21 is equal to or greater than the usage amount threshold for each operation clock of the FPGA in which the data output unit 10 is configured. The usage amount determination unit 17 constantly monitors the difference between the read address and the write address of the FIFO 15 as the usage amount of the FIFO 15, and outputs 0 when the usage amount is less than the usage amount threshold and outputs 1 when the usage amount is equal to or greater than the usage amount threshold. For example, the usage amount threshold is M/2, which is half the maximum number of words M in FIFO 15. The usage amount of the FIFO 15 changes as the phase of the read clock signal changes.

The phase adjustment unit 18 is adapted to perform a first phase adjustment process of decreasing the phase of the read clock signal by a predetermined amount and a second phase adjustment process of increasing the phase of the read clock signal by a predetermined amount. The first phase adjustment process is a process of decreasing the amount of usage amount of the FIFO 15, and the second phase adjustment process is a process of increasing the amount of usage amount of the FIFO 15.

The phase adjustment unit 18 can transition the read address value of the FIFO 15 by adjusting the phase of the read clock signal of the FIFO 15. As a result of this, the parallel data outputted from the FIFO 15 becomes out of phase. However, the phase adjustment unit 18 cannot adjust the phase of the parallel data outputted from the FIFO 15 to an arbitrary value, and the phase adjustment range that can be adjusted at one time is limited. For example, when the output data rate of each of the transceivers 14-1 to **14-*m* is 32 Gbps, the phase adjustment width that can be adjusted by the phase adjustment unit 18** is 1/64 UI step width.

The phase synchronization process of the phase synchronization control unit 31 that controls the phase of the m-bit width parallel data Dp outputted from the transceiver unit 12 will be described below with reference to the state transition diagram of FIG. 3. The phase synchronization process of the phase synchronization control unit 31 is performed independently for each channel, that is, for each transceiver 14-1 to **14-*m***.

Figure 3:
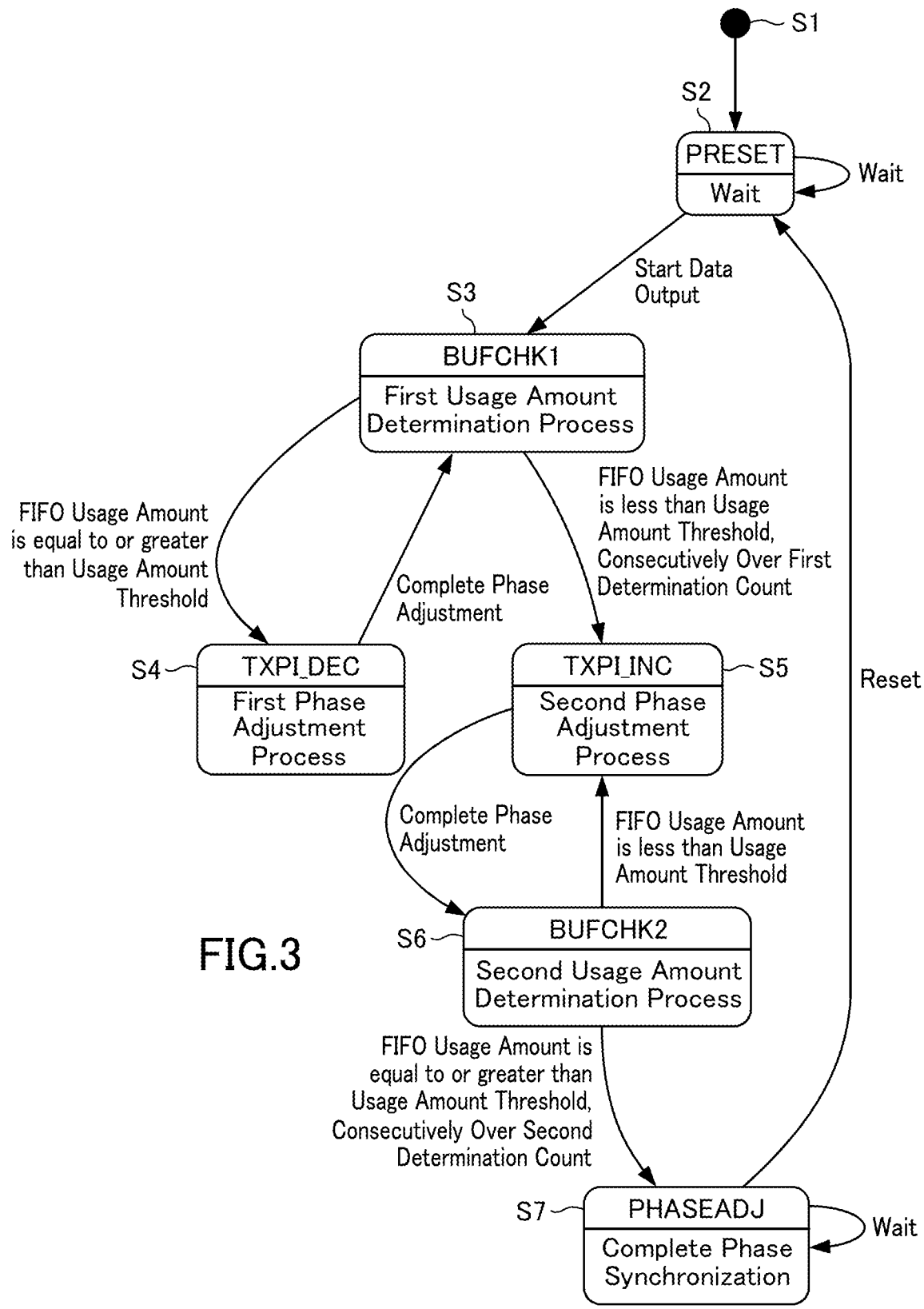
FIG. 3 is a state transition diagram for explaining phase synchronization processing by the signal generation device according to the embodiment of the present invention.

As shown in FIG. 3, the phase synchronization control unit 31 includes eight states S1 to S7, namely initial state, PRESET state, BUFCHK1 state, TXPI_DEC state, TXPI_INC state, BUFCHK2 state, and PHASEADJ state. Arrows between states represent transitions and their directions.

First, the phase synchronization control unit 31 transitions from the initial state S1 to the PRESET state S2. The PRESET state S2 is a state of waiting until each of the transceivers 14-1 to 14-m starts outputting serial data. Here, each of the transceivers 14-1 to 14-m starts generating a clock in a clock generation circuit (not shown) when it becomes ready to start outputting serial data after startup or reset. By detecting the rise of this clock, the phase synchronization control unit 31 can detect the timing at which each of the transceivers 14-1 to 14-m starts outputting serial data.

When the phase synchronization control unit 31 detects that each of the transceivers 14-1 to 14-m has started outputting serial data, it transitions from the PRESET state S2 to the BUFCHK1 state S3. The BUFCHK1 state S3 is a state in which the phase synchronization control unit 31 causes the usage amount determination unit 17 to execute the first usage amount determination process.

The phase synchronization control unit 31 transitions from BUFCHK1 state S3 to TXPI_DEC state S4, on the condition that the usage amount of the FIFO 15 of each of the transceivers 14-1 to 14-m is determined to be equal to or greater than the usage amount threshold by the first usage amount determination process. The TXPI_DEC state S4 is a state in which the phase synchronization control unit 31 causes the phase adjustment unit 18 to perform the first phase adjustment process.

The phase synchronization control unit 31 transitions from the TXPI_DEC state S4 to the BUFCHK1 state S3 again, on the condition that the phase of the read clock signal of the FIFO 15 of each of the transceivers 14-1 to 14-m is decreased by a predetermined amount by the first phase adjustment process.

The phase synchronization control unit 31 transitions from the BUFCHK1 state S3 to the TXPI_INC state S5, on the condition that the count of times that the usage amount of the FIFO 15 of each of the transceivers 14-1 to 14-m is consecutively determined to be less than the usage amount threshold by the first usage amount determination process has reached the first determination count. The TXPI_INC state S5 is a state in which the phase synchronization control unit 31 causes the phase adjustment unit 18 to perform the second phase adjustment process.

The phase synchronization control unit 31 transitions from the TXPI_INC state S5 to the BUFCHK2 state S6, on the condition that the phase of the read clock signal of the FIFO 15 of each of the transceivers 14-1 to 14-m is increased by a predetermined amount by the second phase adjustment processing. The BUFCHK2 state S6 is a state in which the phase synchronization control unit 31 causes the usage amount determination unit 17 to perform the second usage amount determination process.

The phase synchronization control unit 31 transitions from the BUFCHK2 state S6 to the TXPI_INC state S5 again, on the condition that the usage amount of the FIFO 15 of each of the transceivers 14-1 to 14-m is determined to be less than the usage amount threshold by the second usage amount determination process.

The phase synchronization control unit 31 transitions from the BUFCHK2 state S6 to the PHASEADJ state S7, on the condition that the count of times that the usage amount of FIFO 15 of each of the transceivers 14-1 to 14-m is consecutively determined to be equal to or greater than the usage amount threshold by the second usage amount determination process has reached the second determination count. The PHASEADJ state S7 is a state in which the phase synchronization control unit 31 causes the phase adjustment unit 18 to finish adjusting the phase of the read clock signal and waits until the transceivers 14-1 to 14-m receive reset signals.

By performing the processing shown in FIG. 3 for all the transceivers 14-1 to 14-m, the phase synchronization control unit 31 can equalize the usage amount of the FIFOs 15 of all channels by half, so that the data latency of all channels can be aligned. Since the phase of the m×N-bit width parallel data outputted from the parallel data output unit 11 is the same among all the channels, the phase of the serial data outputted from each of the transceivers 14-1 to 14-m is also the same, so that they will be in almost the same phase.

According to the process shown in FIG. 3, when the phase adjustment width by the phase adjustment unit 18 is ¹⁄₆₄ UI, the phase of the serial data outputted from each transceiver 14-1 to 14-m can be adjusted with a calculation accuracy of ±0.008 UI (theoretical limit value). It should be noted that the first and second determination counts may be equal to each other, or may be different from each other.

In the process of the phase synchronization control unit 31 shown in FIG. 3, if the transition from the BUFCHK1 state S3 to the TXPI_DEC state S4, the transition from the BUFCHK2 state S6 to the TXPI_INC state S5, the transition from the BUFCHK1 state S3 to the TXPI_INC state S5, and the transition from the BUFCHK2 state S6 to the PHASEADJ state S7 is executed if each determination condition is satisfied once, the maximum phase difference between the serial data outputted from the m transceivers 14-1 to 14-m after completion of the phase adjustment is a value larger than the above theoretical limit value. This is thought to be because the determination result of the first and the second usage amount determination processes by the usage amount determination unit 17 also fluctuate, as the usage amount of FIFO 15 always fluctuate due to the jitter components of the write clock signal and the read clock signal.

Therefore, in the process of the phase synchronization control unit 31 shown in FIG. 3, as for the transitions from the BUFCHK1 state S3 to the TXPI_INC state S5 and the transition from the BUFCHK2 state S6 to the PHASEADJ state S7, the signal generation device 1 of the present embodiment is adapted to define the first and the second determination counts that these transitions should consecutively satisfy the transition conditions, and perform the transition only in the case that the transition conditions are satisfied those consecutive counts.

Figure 5:
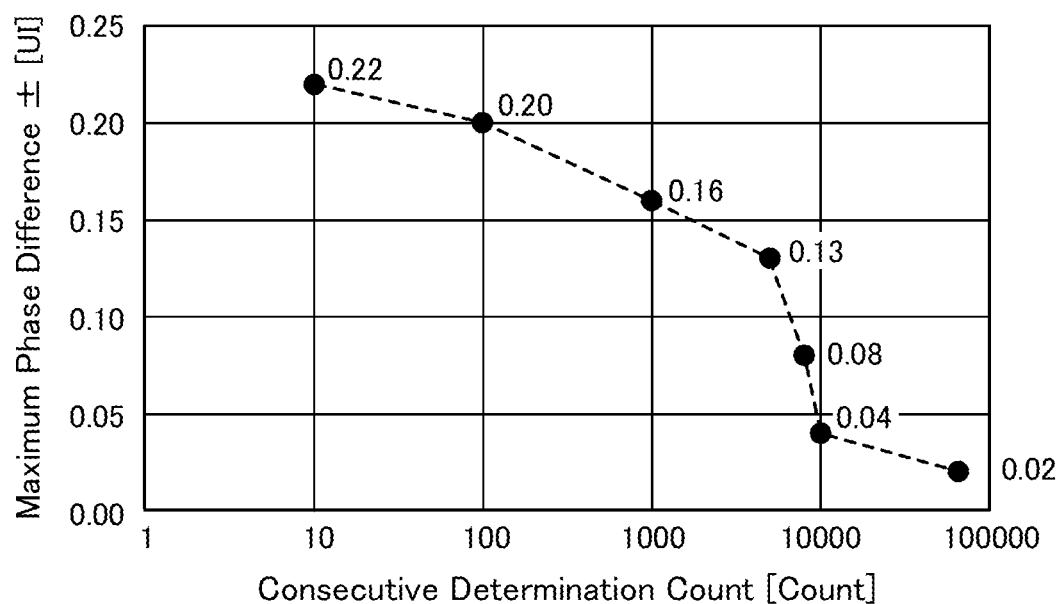
FIG. 5 is a graph showing the relationship between the consecutive determination count in phase synchronization processing and the maximum phase difference between m transceivers.

The interval at which the first and second usage amount determination processes is executed by the usage amount determination unit 17 depends on the operating clock frequency of the FPGA in which the data output unit 10 is configured. For example, a table showing the relationship between the consecutive determination count and the maximum phase difference between m transceivers 14-1 to 14-m is shown in FIG. 4, and the graph there of is shown in FIG. 5, for the cases that the first and second usage amount determination processes are executed at intervals of 8 ns, respectively, when the operating clock frequency of the FPGA is 125 MHz. Here, it is assumed that the first and second determination counts are equal, and for example, that the consecutive determination count is 1000 means that the first determination count is 1000 and the second determination count is also 1000. Also, the output data rate of each of the transceivers 14-1 to 14-m at this time is 32 Gbps per channel. From the results shown in FIGS. 4 and 5, it can be recognized that there is a correlation between the consecutive determination count and the maximum phase difference, and under the condition that the consecutive determination count is 8000 or more, the absolute value of the maximum phase difference is less than 0.1 UI.

Further, when the transition condition is no longer satisfied in the first or second usage amount determination process while the count of consecutive determination count has not been reached, the phase synchronization control unit 31 resets the count of the consecutive determination count. For example, in the first usage amount determination process in the BUFCHK1 state S3, it is determined that the usage amount of the FIFOs 15 of the transceivers 14-1 to 14-m is equal to or greater than the usage amount threshold before reaching the first determination count, the phase synchronization control unit 31 resets the counted first determination count, and transitions to the TXPI_DEC state S4. Similarly, in the case that in the second usage amount determination process in the BUFCHK2 state S6, it is determined that the usage amount of the FIFOs 15 of the transceivers 14-1 to 14-m is less than the usage amount threshold before reaching the second determination count, the phase synchronization control unit 31 resets the counted second determination count, and transitions to the TXPI_INC state S5.

For this reason, even if the consecutive determination count is 65535, the time to complete the first and second phase adjustment processes by the phase adjustment unit 18 is about 50 ms at the most, so that there is little time demerit for increasing the consecutive determination count. Therefore, in this example, by providing a margin and setting the consecutive determination count to 10000 times or more, it is possible to more reliably realize phase adjustment between channels in which the required absolute value of the maximum phase difference is 0.1 UI or less.

Further, in the case that it is necessary to further shorten the time of about 50 ms for completing the first and second phase adjustment processes, in this example, if the consecutive determination count is set between 5000 and 10000, the maximum phase difference can be effectively reduced, compared to the time required for the first and second phase adjustment processes.

Figure 6:
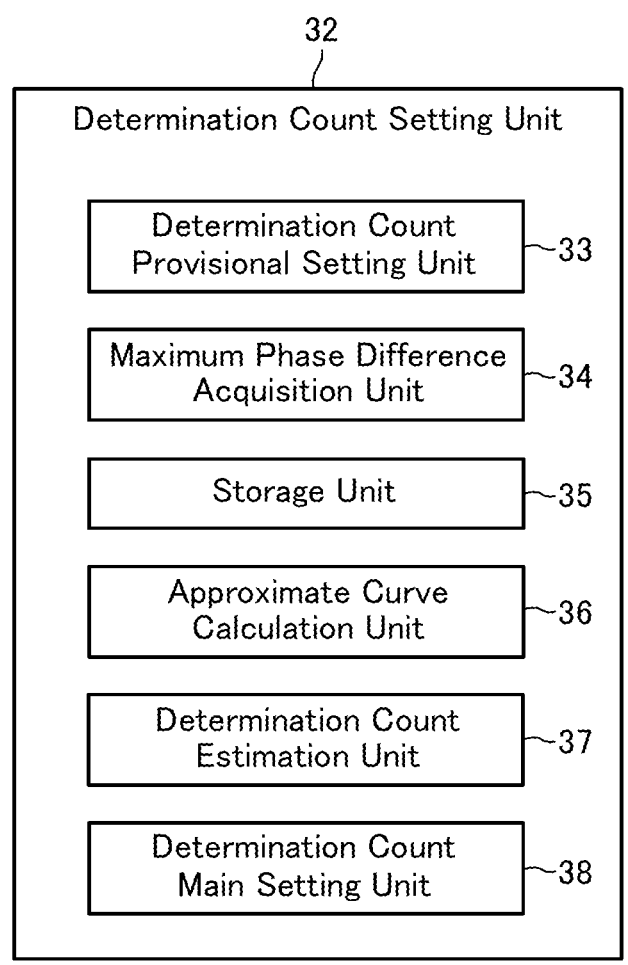
FIG. 6 is a block diagram showing the configuration of a determination count setting unit included in the signal generation device according to the embodiment of the present invention.

The determination count setting unit 32 shown in FIG. 1 and the like is adapted to set the first and second determination counts in the phase synchronization control unit 31. For example, as shown in FIG. 6, the determination count setting unit 32 may include a determination count provisional setting unit 33, a maximum phase difference acquisition unit 34, a storage unit 35, an approximate curve calculation unit 36, a determination count estimation unit 37, and a determination count main setting unit 38.

The determination count provisional setting unit 33 is adapted to provisionally set arbitrary values to the phase synchronization control unit 31 as the first and second determination counts. For example, in the examples shown in FIG. 4 and FIG. 5, one of 10, 100, 1000, 5000, 8000, 10000 and 65535 is set as the first and second determination counts. Accordingly, the phase synchronization control unit 31 executes the process shown in FIG. 3 based on the provisionally set first and second determination counts.

The maximum phase difference acquisition unit 34 is adapted to acquire the maximum phase difference among the phase differences between the serial data respectively outputted from the m transceivers 14-1 to 14-m, when the phase adjustment unit 18 completes adjusting the phase of the read clock signal based on the first and second determination counts set by the determination count provisional setting unit 33 (PHASEADJ state S7).

For example, the maximum phase difference acquisition unit 34 may be adapted to acquire the maximum phase difference from among the phase differences acquired from a measuring instrument (not shown) such as an oscilloscope that measures phase differences between serial data outputted from the m transceivers 14-1 to 14-m.

The storage unit 35 is adapted to store the first and second determination counts provisionally set by the determination count provisional setting unit 33, and the data indicating the relationship with the maximum phase difference acquired by the maximum phase difference acquisition unit 34.

The approximate curve calculation unit 36 is adapted to calculate an approximate curve of the data stored in the storage unit 35.

A method of calculating an approximate curve by the approximate curve calculation unit 36 will be described hereinafter using the data in FIG. 4 and FIG. 5 as an example.

As shown in the graph of FIG. 5, the reason why the maximum phase difference decreases as the consecutive determination count increases is thought to be because the fluctuations in the usage amount of the FIFO 15 due to the jitter components of the write clock signal and the read clock signal are canceled out as the number of the consecutive determination count increases.

The clock jitter component is roughly divided into the time axis direction and the voltage axis direction. Generally, since the amount of jitter in the direction of the time axis is larger and has a greater impact than those of the jitter component in the direction of the voltage axis as a jitter amount, first, attention is paid to the jitter component in the direction of the time axis. The jitter component in the time axis direction is given by the ratio Tj/Tbit of the jitter amount Tj in the time axis direction per 1 bit of the clock and the 1-bit interval Tbit.

Here, it is assumed that the jitter component along the time axis follows an ideal distribution (normal distribution). If the jitter component of the clock has a distribution close to normal distribution, it can be estimated that the relationship between the consecutive determination count and the maximum phase difference will also be close to normal distribution.

Figure 7:
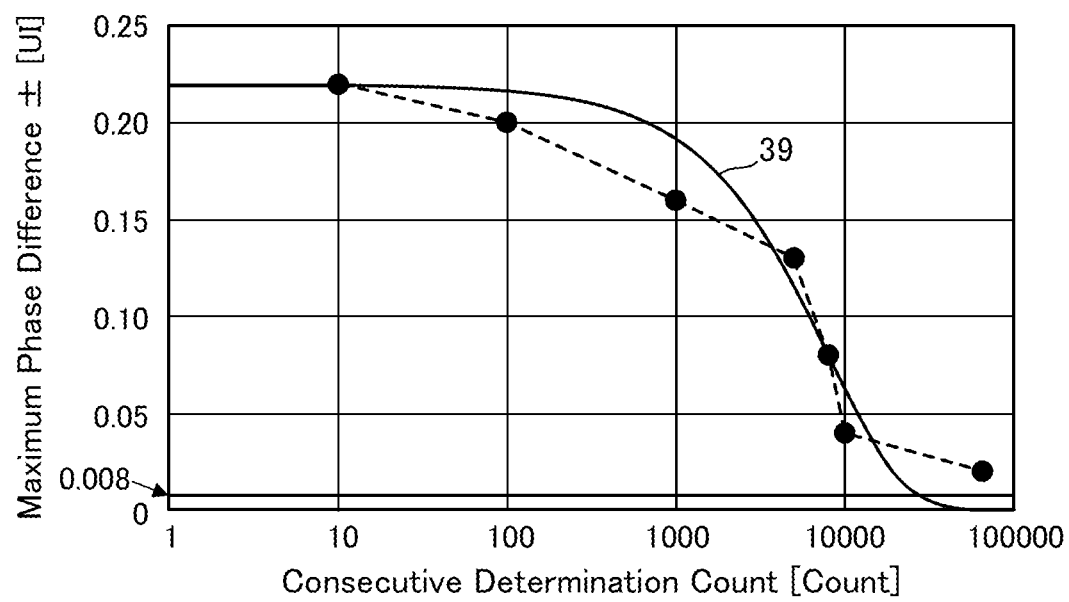
FIG. 7 is a graph showing an approximate curve calculated by an approximate curve calculation unit included in the signal generation device according to the embodiment of the present invention, superimposed on the data of FIG. 5.

FIG. 7 is a graph in which the approximate curve 39 calculated by the approximate curve calculation unit 36 based on the data indicating the relationship between the consecutive determination count and the maximum phase difference stored in the storage unit 35 is superimposed on the data in FIG. 5. The horizontal line at the bottom of the figure indicates the theoretical limit value of ±0.008 UI. Here, the approximate curve 39 shown in FIG. 7 is obtained by adding coefficients $\alpha$ and $\beta$ to the standard normal distribution graph, as shown in the following equation (1).

$$y = f(x) = \frac{\alpha}{\sqrt{2\pi}} \exp\left(-\frac{\beta x^2}{2}\right) \quad (1)$$

First, the approximate curve calculation unit 36 calculates the coefficient $\alpha$ in Equation (1). The coefficient $\alpha$ is 0.55 (=0.22/0.4), which is the ratio of 0.22 UI, the absolute value of the maximum phase difference when the consecutive determination count is 10, to 0.4, the value of the y axis of the vertex of the graph of the standard normal distribution.

Further, the approximate curve calculation unit 36 calculates the coefficient $\beta$ in Equation (1) as shown below. In the graph of FIG. 5, the data point closest to ±0.11 UI, which is half the value of the maximum phase difference ±0.22 UI when the consecutive determination count is 10, is the point where the consecutive determination count is 5000 and the maximum phase difference is ±0.13 UI.

The approximate curve calculation unit 36 extracts the data points of the maximum phase difference in the range of 1/10 to 10/1 of 5000 times of consecutive determination count, which is, 500 times to 50000 times, and obtains an approximate straight line of these data points. The approximate straight line obtained at this time is y=−0.00001326x+ 0.18206522. The coefficient β in Equation (1) is a value for adjusting the approximate curve of equation (1) to contact the approximated straight line y=−0.00001326x+ 0.18206522 at y=0.11.

As shown in FIG. 7, since the data in FIG. 5 is close to the shape of the curve of the standard normal distribution, it can be confirmed that the relationship between the consecutive determination count and the maximum phase difference as shown in FIG. 5 reflects the jitter component of the write clock signal and the read clock signal.

Next, the jitter component in the voltage direction will be discussed. In FIG. 7, the data points after 65535 consecutive determination counts where the jitter component in the time direction is no longer dominant are considered not to asymptotically approach like the graph of the approximate curve 39 due to the effect of the theoretical limit value. This means that, it can be the that the difference between the approximate curve 39 based on this standard normal distribution and the data point of the maximum phase difference after 65535 consecutive determination counts is due to the jitter component in the voltage direction and the theoretical limit.

Returning to FIG. 6, the determination count estimation unit 37 is adapted to estimate the consecutive determination count or the first and second determination counts that realize the target maximum phase difference based on the approximate curve 39 calculated by the approximate curve calculation unit 36. For example, the target maximum phase difference may be set within a range that satisfies the maximum phase difference ±0.1 UI by the user's operation input to the operation unit 43.

For example, the determination count estimation unit 37 can estimate the optimum consecutive determination count by obtaining the intersection of the theoretical limit value and the approximate curve 39, or the intersection of another target maximum phase difference value and the approximate curve 39. In this way, by obtaining the optimum consecutive determination count by the determination count estimation unit 37, it is not necessary to unnecessarily increase the consecutive determination count, so that the completion time of the phase synchronization process by the phase synchronization control unit 31, as shown in the state transition diagram in FIG. 3, can be shortened.

In the examples shown in FIG. 4 and FIG. 5, the maximum time required for the phase synchronization control unit 31 to complete the phase synchronization processing was about 50 ms, but this is a value under the condition that the operating clock frequency of the FPGA is 125 MHz. Even under conditions where operation at a lower operating clock frequency is forced due to device or power restrictions, the signal generation device 1 of the present embodiment can realize the phase synchronization between channels in a minimum amount of time, by estimating the consecutive determination count using the approximate curve 39 as described above.

Alternatively, the determination count setting unit 32 may set the first and second determination counts or consecutive determination count to the phase synchronization control unit 31 inputted by the user through the operation unit 43 within a range where the maximum phase difference of ±0.1 UI can be realized. For example, in the examples of FIG. 4 and FIG. 5, the user may be allowed to freely set the consecutive determination count in the range of 8000 to 65535 to the determination count setting unit 32.

The determination count main setting unit 38 is adapted to perform the main setting of the first and second determination counts or the consecutive determination count inputted by the user through the operation unit 43, or the first and second determination counts or the consecutive determination count estimated by the determination count estimation unit 37 to the phase synchronization control unit 31.

Returning to FIG. 1, the configuration and function of the inter-channel phase adjustment unit 40 are the same as those of the error rate measurement device described in Japanese Patent No. 6346212. This means that, the inter-channel phase adjustment unit 40 in the present embodiment is adapted to variate the phase of the clock signal CK3 which is externally inputted by m phase variator (not shown) corresponding to the count of channels of the transceivers 14-1 to 14-*m*, and to punch out the serial data outputted from each of the transceivers 14-1 to 14-*m* on a channel-by-channel basis at the timing of this variated clock signal. The phase amount of each phase variator is adjusted based on the center position of the opening of the eye pattern for each channel of the serial data outputted from each transceiver 14-1 to 14-*m*. Since the absolute value of the maximum phase difference between the serial data outputted from each of the transceivers 14-1 to 14-*m* is reduced to 0.1 UI or less, the inter-channel phase adjustment unit 40 can align the phases of the serial data constituting the parallel data Dp outputted from the transceiver unit 12 in all the channels. As the clock signal CK3, the clock signal CK1 or the data request signal A' may be used.

The configuration and function of the MUX 41 are, for example, similar to the multiplexer described in Patent No. 6082419. This means that the MUX 41 in this embodiment is capable of latching the m-bit width parallel data Dp outputted from the transceiver unit 12 through the inter-channel phase adjustment unit 40, selecting n bits in a predetermined order in synchronization with a high-speed reference clock signal CK1, and outputting as n-bit width data Ds according to the rate of the reference clock signal CK1. Here, n is an integer of 1 or more. This means that the MUX 41 can multiplex m-channel outputs from the transceiver unit 12 into n-channels.

Further, the MUX 41 is adapted to divide the reference clock signal CK1 by m to generate a dividing clock signal A, and outputs the generated dividing clock signal A to the synchronization device 50. The dividing clock signal A is a data request signal for requesting the next parallel data Dp from the transceiver unit 12 every time the MUX 41 outputs m data. Further, the dividing clock signal A determines the operation timing of serial conversion processing of the MUX 41.

The configuration and function of the synchronization device 50 are similar to the synchronization device described in Japanese Patent No. 6082419. This means that the synchronization device 50 in this embodiment measures the phase difference between the phase of the dividing clock signal A outputted from MUX 41 and the phase of the data synchronization clock signal CKp outputted from the transceiver unit 12 in synchronization with the output timing of the m-bit width parallel data Dp, and adjusts the output timing of the parallel data Dp from the transceiver unit 12 based on the measured phase difference.

For example, the synchronization device 50 is adapted to adjust the timing of the dividing clock signal CK2 (see FIG. 8) of the reference clock signal CK1 according to the phase difference between the dividing clock signal A and the data synchronization clock signal CKp to generate the data request signal A', and output a data request signal A' to the transceiver unit 12. By this, the synchronization device 50 can synchronize the m-bit width parallel data Dp outputted from the transceiver unit 12 and the dividing clock signal A.

Since the data output unit 10 in this embodiment can output parallel data Dp in which the absolute value of the maximum phase difference between channels is 0.1 UI or less, when the MUX 41 multiplexes the parallel data Dp outputted from the transceiver unit 12 through the inter-channel phase adjustment unit 40, unintended data is not generated.

The DAC 42 is an n-bit DAC, and is adapted to output an analog signal corresponding to the n-bit width data Ds outputted from the MUX 41, which is a multilevel K PAM signal. It should be noted that the MUX 41 and the DAC 42 may be separate or integrated. For example, when the signal generation device 1 of the present embodiment serializes 32 Gbps 32 serial data outputted from each channel of the transceiver unit 12 via the inter-channel phase adjustment unit 40 using the MUX 41 and the DAC 42, it can generate 128 G Symbol/s (1024 Gbps) analog signals, so that a signal desirable as a test signal for BER measurement can be generated.

The operation unit 43 is provided for accepting an operation input by the user, and is constituted by, for example, a touch panel equipped with a touch sensor for detecting a contact position by a contact operation on an input surface corresponding to the display screen of the display device. Alternatively, the operation unit 43 may be configured to include an input device such as a keyboard or mouse. An operation input to the operation unit 43 is detected by the control unit 60. For example, the user can arbitrarily set the pattern information to be inputted to the parallel data output unit 11, the target maximum phase difference, the first and second determination counts, or the consecutive determination count by the operation unit 43.

The control unit 60 is constituted by a microcomputer or personal computer including, for example, a CPU (Central Processing Unit), ROM (Read Only Memory), RAM (Random Access Memory), HDD (Hard Disk Drive), and the like, and controls the operation of the above-mentioned portions that constitute the signal generation device 1 according to a program stored in advance in ROM.

As explained above, the signal generation device 1 according to this embodiment has the second usage amount determination process execute, on the condition that the count that the usage amount of the FIFO 15 of each of the transceivers 14-1 to 14-m is consecutively determined to be less than the usage amount threshold by the first usage amount determination process has reached the first determination count. The signal generation device 1 according to the present embodiment completes adjusting the phase of the read clock signal, on the condition that the count that the usage amount of the FIFO 15 of each of the transceivers 14-1 to 14-m is consecutively determined to be equal to or greater than the usage amount threshold by the second usage amount determination process reaches the second determination count. By this configuration, the signal generation device 1 according to the present embodiment can reduce the absolute value of the maximum phase difference between the serial data outputted from the plurality of transceivers 14-1 to 14-m to 0.1 UI or less.

For example, when the output of one channel of the transceivers 14-1 to 14-m of the FPGA in which the data output unit 10 is configured is 32 Gbps, if the read clock signal phase is not adjusted, the phase difference between the channels is about ±500 ps, ±8 UI. On the other hand, when the phase synchronization processing of the phase synchronization control unit 31 shown in the state transition diagram of FIG. 3 is used, the maximum phase difference between channels can be reduced to about ±0.02 UI.

Further, in the signal generation device 1 according to the present embodiment, by configuring the data output unit 10 on the FPGA, the bit width of the parallel data outputted from the parallel data output unit 11 and the number of channels m of the transceivers 14-1 to 14-m can be easily changed, allowing the device to flexibly dealt with any changes or expansions in standards in the future.

Also, the signal generation device 1 according to the present embodiment can estimate the optimum count of determinations by approximating the first and second determination counts and the measurement results of the maximum phase difference. Thus, the signal generation device 1 according to the present embodiment does not need to increase the count of determinations unnecessarily, by obtaining the optimum count of determinations, and can shorten the completion time of phase synchronization process between transceiver channels.

Further, in the signal generation device 1 according to the present embodiment, since the absolute value of the maximum phase difference between the serial data outputted from the plurality of transceivers 14-1 to 14-m is reduced to 0.1 UI or less, it is possible to prevent the inter-channel phase adjustment unit 40 from adjusting the phases of these serial data at positions where the phases between these serial data are shifted by one or more clocks. Thus, the signal generation device 1 according to the present embodiment can generate intended serial data when multiplexing the parallel data outputted from the inter-channel phase adjustment unit 40 using the MUX 41.

REFERENCE NUMERALS

1 Signal Generation Device
10 Data Output Unit
11 Parallel Data Output Unit
12 Transceiver Unit
13 Clock Generation Unit
14-1 to 14-m Transceiver
15 FIFO
16 PISO
17 Usage Amount Determination Unit
18 Phase Adjustment Unit
19, 20 Frequency Divider
21 Subtractor
31 Phase Synchronization Control Unit
32 Determination Count Setting Unit
33 Determination Count Provisional Setting Unit
34 Maximum Phase Difference Acquisition Unit
35 Storage Unit
36 Approximate Curve Calculation Unit
37 Determination Count Estimation Unit
38 Determination Count Main Setting Unit
39 Approximate Curve
40 Inter-Channel Phase Adjustment Unit
41 MUX
42 DAC
43 Operation Unit
50 Synchronization Device
60 Control Unit

What is claimed is:

1. A signal generation device, comprising:
   a parallel data output unit that outputs m×N-bit width parallel data;
   a transceiver unit that converts the m×N-bit width parallel data outputted from the parallel data output unit into m-bit width parallel data and outputs the data; and
   a phase synchronization control unit that controls the phase of the m-bit width parallel data outputted from the transceiver unit,
   wherein
   the transceiver unit has m transceivers that convert N-bit width parallel data out of the m×N-bit width parallel data into 1-bit width serial data,
   each of the transceivers has:
   a FIFO (First-In First-Out) that stores the N-bit width parallel data and reads out the N-bit width parallel data according to a read clock signal;
   a PISO (Parallel-In Serial-Out) that converts the N-bit width parallel data read from the FIFO into the 1-bit width serial data;
   a usage amount determination unit that executes usage amount determination process for determining whether the usage amount of the FIFO is equal to or greater than the usage amount threshold; and
   a phase adjustment unit that performs a first phase adjustment process for decreasing the phase of the read clock signal by a predetermined amount and a second phase adjustment process for increasing the phase of the read clock signal by a predetermined amount,
   the phase synchronization control unit performs:
   the phase synchronization control unit has the usage amount determination unit perform a first usage amount determination process as the usage amount determination process, on the condition that the output of the serial data from each of the transceivers has started;
   the phase synchronization control unit has the phase adjustment unit perform the first phase adjustment process, on the condition that the usage amount of the FIFO of each transceiver is determined to be greater than the usage amount threshold by the first usage amount determination process;
   the phase synchronization control unit has the usage amount determination unit perform a second usage amount determination process as the usage amount determination process, on the condition that the count that the usage amount of the FIFO of each transceiver is consecutively determined by the first usage amount determination process to be less than the usage amount threshold reaches a first determination count;
   the phase synchronization control unit has the phase adjustment unit perform the second phase adjustment process, on the condition that the usage amount of the FIFO of each of the transceivers is determined to be less than the usage amount threshold by the second usage amount determination process; and
   the phase synchronization control unit has the phase adjustment unit complete the adjustment of the phase of the read clock signal, on the condition that the count that the usage amount of the FIFO of each of the transceivers is consecutively determined by the second usage amount determination process to be greater than the usage amount threshold reaches a second determination count.

2. The signal generation device according to claim 1, wherein the parallel data output unit, the transceiver unit, and the phase synchronization control unit are configured on an FPGA (Field Programmable Gate Array).

3. The signal generation device according to claim 1, wherein
   a determination count setting unit that sets the first and second determination counts to the phase synchronization control unit is further provided,
   the determination count setting unit includes:
   a determination count provisional setting unit that provisionally sets arbitrary values to the phase synchronization control unit as the first and second determination counts;
   a maximum phase difference acquisition unit that acquires a maximum phase difference among the phase differences between the serial data outputted from each of the m transceivers when the phase adjustment of the read clock signal by the phase adjustment unit based on the first and second determination counts provisionally set by the determination count provisional setting unit is completed;
   a storage unit that stores data indicating a relationship between the first and second determination counts provisionally set by the determination count provisional setting unit and the maximum phase difference acquired by the maximum phase difference acquisition unit;
   an approximate curve calculation unit that calculates an approximate curve of the data stored in the storage unit;
   a determination count estimation unit that estimates the first and second determination counts for realizing the maximum phase difference to be targeted based on the approximate curve; and
   a determination count main setting unit that performs a main setting of the first and second determination counts estimated by the determination count estimation unit to the phase synchronization control unit.

4. The signal generation device according to claim 1, further provided with:
   a multiplexer that receives the m-bit width parallel data outputted from the transceiver unit based on a dividing clock signal by which a reference clock signal is divided by m and outputs n-bit width data in accordance with the rate of the reference clock signal;
   a synchronization device that synchronizes the m-bit width parallel data outputted from the transceiver unit with the dividing clock signal based on the phase difference between the phase of a data synchronization clock signal synchronized with the m-bit width parallel data outputted from the transceiver unit and the phase of the dividing clock signal; and
   a DAC that outputs an analog signal in accordance with the n-bit width data outputted from the multiplexer.

5. A signal generation method, using a signal generation device, wherein
   the signal generation device has a parallel data output unit that outputs m×N-bit width parallel data; and a transceiver unit that converts the m×N-bit width parallel data outputted from the parallel data output unit into m-bit width parallel data and outputs the data,
   the signal generation device has a phase synchronization control unit that controls the phase of the m-bit width parallel data outputted from the transceiver unit,
   the transceiver unit has m transceivers that convert N-bit width parallel data out of the m×N-bit width parallel data into 1-bit width serial data, each of the transceivers has:
a FIFO (First-In First-Out) that stores the N-bit width parallel data and reads out the N-bit width parallel data according to a read clock signal;
a PISO (Parallel-In Serial-Out) that converts the N-bit width parallel data read from the FIFO into the 1-bit width serial data;
a usage amount determination unit that executes usage amount determination process for determining whether the usage amount of the FIFO is equal to or greater than the usage amount threshold; and
a phase adjustment unit that performs a first phase adjustment process for decreasing the phase of the read clock signal by a predetermined amount and a second phase adjustment process for increasing the phase of the read clock signal by a predetermined amount,
the phase synchronization control unit performs:
a step to have the usage amount determination unit perform a first usage amount determination process as the usage amount determination process, on the condition that the output of the serial data from each of the transceivers has started;
a step to have the phase adjustment unit perform the first phase adjustment process, on the condition that the usage amount of the FIFO of each transceiver is determined to be greater than the usage amount threshold by the first usage amount determination process;
a step to have the usage amount determination unit perform a second usage amount determination process as the usage amount determination process, on the condition that the count that the usage amount of the FIFO of each transceiver is consecutively determined by the first usage amount determination process to be less than the usage amount threshold reaches a first determination count;
a step to have the phase adjustment unit perform the second phase adjustment process, on the condition that the usage amount of the FIFO of each of the transceivers is determined to be less than the usage amount threshold by the second usage amount determination process; and
a step to have the phase adjustment unit complete the adjustment of the phase of the read clock signal, on the condition that the count that the usage amount of the FIFO of each of the transceivers is consecutively determined by the second usage amount determination process to be greater than the usage amount threshold reaches a second determination count.

6. The signal generation device according to claim 2, wherein
a determination count setting unit that sets the first and second determination counts to the phase synchronization control unit is further provided,
the determination count setting unit includes:
a determination count provisional setting unit that provisionally sets arbitrary values to the phase synchronization control unit as the first and second determination counts;
a maximum phase difference acquisition unit that acquires a maximum phase difference among the phase differences between the serial data outputted from each of the m transceivers when the phase adjustment of the read clock signal by the phase adjustment unit based on the first and second determination counts provisionally set by the determination count provisional setting unit is completed;
a storage unit that stores data indicating a relationship between the first and second determination counts provisionally set by the determination count provisional setting unit and the maximum phase difference acquired by the maximum phase difference acquisition unit;
an approximate curve calculation unit that calculates an approximate curve of the data stored in the storage unit;
a determination count estimation unit that estimates the first and second determination counts for realizing the maximum phase difference to be targeted based on the approximate curve; and
a determination count main setting unit that performs a main setting of the first and second determination counts estimated by the determination count estimation unit to the phase synchronization control unit.

7. The signal generation device according to claim 2, further provided with:
a multiplexer that receives the m-bit width parallel data outputted from the transceiver unit based on a dividing clock signal by which a reference clock signal is divided by m and outputs n-bit width data in accordance with the rate of the reference clock signal;
a synchronization device that synchronizes the m-bit width parallel data outputted from the transceiver unit with the dividing clock signal based on the phase difference between the phase of a data synchronization clock signal synchronized with the m-bit width parallel data outputted from the transceiver unit and the phase of the dividing clock signal; and
a DAC that outputs an analog signal in accordance with the n-bit width data outputted from the multiplexer.

* * * * *